United States Patent [19]

McClain

[11] 4,151,134
[45] Apr. 24, 1979

[54] PROCESS FOR SIMULTANEOUSLY DISPERSING AND SAPONIFYING ETHYLENE-VINYL ACETATE COPOLYMER

[75] Inventor: Dorothee M. McClain, Cincinnati, Ohio

[73] Assignee: National Distillers and Chemical Corporation, New York, N.Y.

[21] Appl. No.: 824,934

[22] Filed: Aug. 15, 1977

[51] Int. Cl.$^2$ .............................. C03K 3/24; C08K 9/05
[52] U.S. Cl. .......................... 260/23 H; 260/29.6 PM; 526/10
[58] Field of Search ..................... 260/23 H, 29.6 PM; 526/10

[56] References Cited

U.S. PATENT DOCUMENTS 4,027,079   5/1977   McClain ................................. 526/10

FOREIGN PATENT DOCUMENTS 88404   3/1972   Fed. Rep. of Germany.

*Primary Examiner*—James H. Derrington
*Attorney, Agent, or Firm*—Kenneth D. Tremain

[57] ABSTRACT

A process is disclosed for simultaneously dispersing and saponifying ethylene-vinyl acetate copolymer to provide saponified ethylene-vinyl acetate copolymer of a desired degree of saponification in finely divided form by employing soap dispersants for said copolymer in a saponification medium comprising a strong base.

7 Claims, No Drawings

PROCESS FOR SIMULTANEOUSLY DISPERSING AND SAPONIFYING ETHYLENE-VINYL ACETATE COPOLYMER

BACKGROUND OF THE INVENTION

1. Field of the Invention

This invention relates to processes for preparing saponified ethylene-vinyl acetate copolymer, and more particularly, to processes which simultaneously effect the saponification and dispersion of ethylene-vinyl acetate copolymer to fine particulate form.

2. Description of the Prior Art

Processes for simultaneously dispersing and saponifying ethylene-vinyl acetate (EVA) copolymers to provide particulate hydrolyzed ethylene-vinyl acetate (HEVA) copolymers are known. In German Democratic Republic (DDR) Patent No. 88,404, there is described a process for simultaneously dispersing and saponifying EVA copolymers employing sodium hydroxide or potassium hydroxide as the saponification agent and an alkyl sulfonate, an acyl derivative of N-methyltaurine, a higher fatty acid soap, an alkaryl sulfonate or a nonionic surface-active agent derived from ethylene oxide as the dispersion agent.

The process described involves saponifying ethylene-vinyl acetate copolymers at elevated temperature and pressure including, as the final step, discharging the reaction mixture at the operating temperature and pressure directly into a quench vessel at atmospheric or subatmospheric pressure. The quench vessel contains water that is stirred during the discharge operation and the rate of discharge of the reaction mixture is regulated by means of a needle valve. Thus, the sudden release of the reaction mixture causing a portion of the reaction medium to vaporize apparently results in formation of the dispersion due to the atomizing effect of the needle valve. This patent also discloses the optional use of dispersants, but it is apparent from the data provided that such dispersants have only a secondary effect, the primary determinant of dispersion being the discharge of the hot reaction mixture to the quenching bath. From the particle size distribution data provided in the disclosure, it is clear that the presence of dispersing agent seems to favor smaller particles, but is not absolutely essential since comparable dispersions are obtained when dispersing agents are not present in the reaction mixture. There is no indication that a dispersion of the polymer occurs in the reaction mixture prior to discharge when dispersing agents are present but the data provided shows that, on discharge, a dispersion is produced in the presence or absence of dispersing agent. Attempts to obtain dispersions of saponified EVA using N-oleoylsarcosinate as dispersing agent by merely cooling the reaction mixture without the described discharge step of DDR No. 88,404 have not produced dispersions. Similarly, when arylsulfonate dispersants are employed in lieu of the sarcosinate, no dispersions are obtained when the reaction mixture is cooled. Thus, it must be concluded that dispersion only occurs on discharge.

The dispersed product obtained by the method of No. 88,404 is of fairly large particle size, the heavy majority of the particles being of diameters greater than 0.125 mm, i.e., usually over 80% of the dispersed particles. In addition, the product is composed of irregular particles, with no spherical particles being observed.

It has also been determined that certain other known and conventional dispersants are not effective in the production of such dispersions of EVA copolymers. The condensed aryl sulfonate salt dispersants are not effective in the dispersion to fine, particulate form of saponified ethylene-vinyl acetate polymers from saponification reaction mixtures. Experience to the present time with these dispersing agents has shown little, if any, tendency to produce a dispersion of the saponified product, the product obtained being a continuous mass which adhered to the walls of the reactor and the agitator. Similarly, the ethylene oxide-propylene oxide block copolymer dispersing agents described in U.S. Pat. No. 3,422,049 have been found to be ineffective in producing fine dispersions of saponified ethylene-vinyl acetate copolymers except where the residual salt content of the saponified product is reduced to not more than 0.1% calculated as cation as described in copending U.S. Pat. No. 4,027,079.

In contrast, the present invention provides a product at rapid rates with excellent reproducibility whose particle size can be controlled by regulating the amount of soap dispersant employed. Moreover, when a water-soluble, substantially neutral salt is also present during the dispersion-saponification process, it in itself favors the formation of finer particles and promotes particle sphericity.

Although the present invention is not restricted to the production of spherical particles, and for some purposes spherical particles are not necessary or advantageous, it is nevertheless true that spherical particle shape is often of substantial importance in the commercial applications of the present products, contributing superior fluidization characteristics, shorter melting time, and improved dispersibility to pulverulent compositions in which they are used. Thus, the spherical shaped particles are superior in powder form for static or fluidized dip coating, spraying, dusting and flame spraying applications as well as for preparing relatively stable dispersions in water or other liquids for use in roller, dip or spray coating.

SUMMARY OF THE INVENTION

It has now been discovered that EVA copolymers can be readily and conveniently dispersed and saponified in the same medium to provide finely divided HEVA copolymers employing an alkali metal soap dispersant.

Broadly stated, the process of this invention comprises:

(a) agitating, in the molten state, an ethylene-vinyl acetate copolymer in an aqueous medium comprising an alkali metal soap of a higher carboxylic acid and a strong inorganic or organic base in an amount sufficient to saponify the copolymer to a desired degree of saponification; and (b) cooling the resulting dispersion below about 100° C. to provide said copolymer in solid, finely divided form.

In addition to simplicity, the process herein provides HEVA copolymer particles of desirable spherical shape, acceptable fineness, the degree of hydrolysis, or saponification, which can be easily regulated to fall within a predetermined range.

DESCRIPTION OF THE PREFERRED EMBODIMENTS

The EVA copolymers employed in the practice of this invention can be prepared by any suitable polymerization process. Although the copolymers can be obtained by way of dispersion or emulsion polymerization techniques, they are advantageously prepared by the much faster high pressure bulk polymerization processes in current use. The starting EVA copolymers herein contain from about 5% to about 95% by weight of combined ethylene, the balance of the polymer being made up of combined vinyl acetate. The copolymers can also contain up to about 20% by weight of a combined third comonomer polymerizable with ethylene and vinyl acetate. Illustrative termonomers are methyl acrylate, methyl methacrylate, ethyl acrylate, ethyl methacrylate, propyl acrylate, propyl methacrylate, butyl acrylate, butyl methacrylate, dimethyl itaconate, diethyl itaconate, dimethyl-2-methylene glutarate, diethyl-2-methylene glutarate, dimethyl maleate, diethyl fumarate, dibutyl fumarate, and the like. In these terpolymers, 5 to 95 percent of the weight of the remainder will comprise vinyl acetate units and 95 to 5 percent ethylene units.

The process of this invention is especially effective with EVA copolymers having a melt index of less than about 40, particularly those having a melt index of less than about 25 and more particularly EVA copolymers having a melt index of less than about 10. Of course, the present process is effective with polymers of higher melt index, e.g., the polymers described in the aforesaid DDR 88,404 having melt index of 100 and higher. Obviously, melt index of the polymer substrate is not a critical consideration as far as the present process is concerned.

In accordance with the present process, the EVA copolymer is agitated in the molten state in an aqueous dispersion system comprising an alkali metal soap of a higher carboxylic acid, the alkali metal soaps being preferred, and strong base to provide the desired degree of saponification. The saponification reaction generally proceeds stoichiometrically. Upon cooling to below about 100° C., the saponified copolymer will be recoverable in a finely divided, particulate form.

The present process is accomplished by simultaneously saponifying and dispersing the EVA polymer. The order of the addition of the reactants to the reaction medium is not critical. Thus, the dispersion system can be added to the saponification medium before or after the strong base, or simultaneous with the strong base, as desired. The starting polymer can be added separately or simultaneously with the reagents.

The dispersion systems of the present invention are fully disclosed in commonly assigned, copending, concurrently filed U.S. Pat. application Ser. Nos. 824,873; 824,874; and 824,936 incorporated herein by reference for the said disclosure. These applications disclose dispersing systems for dispersing polymers without, however, causing any substantial hydrolysis of the polymer substrate. The said dispersing systems comprise a soap and generally include a water-soluble, substantially neutral salt except where the starting polymer substrate contains at least about 35% by weight of vinyl acetate, in which event the salt is optionally present unless its general effect in modifying particle size is desirable.

When dispersing EVA polymers that contain low levels of vinyl acetate comonomer, it is usually preferable to employ soaps formed in situ, i.e., by neutralizing the selected fatty acid with the selected base in the dispersion medium, since soaps formed in situ appear to give better results than obtained with preformed soaps. Thus, with EVA copolymers containing up to about 15% vinyl acetate, soaps formed in situ are preferred. Either preformed or in situ soaps can be employed with EVA of higher vinyl acetate content.

In contrast, however, when, as in the present invention, it is desired to effect simultaneously, i.e., in the same operation, both the dispersion and saponification of the EVA copolymer substrate, it is surprisingly found that a preformed soap alone is an effective dispersant over substantially the entire EVA composition range of 5 to 95 percent by weight of vinyl acetate. In situ soaps are, however, also very effective and often more convenient to use.

Unexpectedly, for a given copolymer substrate and degree of saponification, it is found that the particle size of the HEVA product is strongly dependent upon the soap concentration during the dispersion-saponification process, high concentration of soap favoring finer particle sizes. Adjustment of the soap level therefore represents an extremely simple and convenient means of controlling particle size.

Over and above the aforesaid effect of soap concentration on particle size is the effect on particle size of added water-soluble, substantially neutral salt. Such salts, present during simultaneous dispersion-saponification, generally cause a marked reduction in particle size, and at the same time favor the formation of spherical particles.

The preferred soaps for preparing the dispersions of this invention are soaps of alkali metals of atomic weight of at least 23, i.e., sodium, potassium, rubidium and cesium, and, of these, the more preferred are sodium and potassium because of their availability or ease of preparation, the most preferred being sodium which is most economical and practical.

The soaps for use in the present invention are known compounds, i.e. salts of higher carboxylic acids with the alkali metals. The acid moiety of the soap can be saturated or unsaturated, most commonly ethylenically-unsaturated, linear or branched and can be composed of a mixture of such acids, for example, as is obtained by saponification of natural glyceride fats. Included in the term "higher carboxylic acid" as used in this invention are the so-called dimer acids made by dimerization of polyunsaturated linear fatty acids. The soap should not react adversely to any appreciable extent with the polymer substrate, i.e., should be substantially inert to the polymer. As employed herein, and in the appended claims, the term "soap" embraces the aforesaid salts of higher carboxylic acids, particularly the well-known fatty acids.

The preferred acid is a straight-chain $C_8$—$C_{22}$ monocarboxylic acid, which may be saturated or may contain one carbon-carbon double bond per molecule, and can contain even or odd number of carbon atoms. Examples are caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid and brassidic acid, as well as mixtures of such acids.

Of the strong inorganic bases used as saponification agents herein, the alkali metal hydroxides are preferred.

Examples of the alkali metal hydroxides that can be used are sodium hydroxide, potassium hydroxide and lithium hydroxide. Sodium hydroxide and potassium hydroxide are more preferred and of these, sodium hydroxide is most preferred due to its low cost and ready availability. Mixtures of the said alkali metal compounds can be employed.

It is usually preferred that the ratio of polymer to water range from about 0.1 to about 3 parts of polymer per part of water on a weight basis. Lower ratios are operable, but uneconomical, whereas higher ratios, though usable, present operational difficulties. The most preferred range is about 0.2 to about 0.5 parts of polymer per part of water on a weight basis.

The weight ratio of alkali metal soap dispersant to polymer can vary from about 0.01 to about 0.4, the preferred ratio being from about 0.06 to about 0.25. The use of lower ratios of soap does not always result in the desired dispersion of the copolymer; higher ratios are generally unnecessary and therefore uneconomical. The preferred soap is sodium stearate and the preferred base for saponification is sodium hydroxide.

As hereinbefore mentioned, the dispersion systems of this invention can include a water-soluble, substantially neutral salt to decrease HEVA copolymer particle size and promote particle sphericity. For the purposes of this invention, a substantially neutral salt is defined as a salt that, at a concentration of 1 mole per liter in pure water at 20° C., yields a solution having a pH between 4 and 9. The cation is derived from an alkali metal or any other metal that does not react with the base nor from insoluble soaps with the above-disclosed fatty acids at the operating temperature of the process, i.e., is inert to the soap employed. The cation may be monovalent, divalent or of higher valence. The nature of the anion of the salt does not appear to be critical; the anion can be, for example, fluoride, chloride, bromide, iodide, bisulfate, sulfate, hydrogen phosphate, dihydrogen phosphate, nitrate, bicarbonate, acetate or propionate anion, or similar such anions. Mixtures of salts can be employed.

Specific examples of the water-soluble salts are lithium fluoride, lithium chloride, sodium chloride, sodium bisulfate, sodium sulfate, sodium hydrogen phosphate, potassium chloride, potassium dihydrogen phosphate, sodium acetate, sodium propionate, potassium acetate, etc. The cation of the soap and the water-soluble salt may be the same or different.

The concentration of water-soluble salt in water can range from at least about 0.1 and up to about 15 weight percent, the preferred concentration being from about 1 to about 7 weight percent. Sodium chloride, sodium sulfate, and sodium acetate are the preferred water-soluble salts. Sodium acetate is advantageous since it is produced in the saponification of EVA with sodium hydroxide. The amount used will, of course, always be in excess of that produced by the saponification. Halide salts, particularly chlorides, though operable, are not preferred with stainless steel equipment because of the tendency to cause stress cracking of the steel. A nickel alloy (Monel) is preferred for halide service.

The dispersion temperature may range from about 100° to about 350° C., but temperatures of from about 150° to about 250° C. are preferred. Dispersions are usually not readily obtainable at lower temperatures and higher temperatures are usually not required for successful dispersion. The pressure is autogenous. The rate of stirring should vary from about 800 to about 4000 rpm with from about 1200 to about 3800 rpm being preferred, although stirring rates that are lower are at times sufficient. Higher stirring rates usually are not advantageous. The dispersion-saponification times range from about 1 minute to about 1 hour; times of about 5 to about 15 minutes are preferred.

The dispersions of the HEVA copolymer substrate produced in accordance with the present invention are generally composed of particles, of a number average diameter ranging from about 20 microns up to about 500 microns, with the majority of particles usually being less than 250 microns. With the preferred dispersing systems, a substantial majority of the particles are less than about 150 microns, usually ranging from about 20 to about 150 microns with most of the particles being in the range of about 50 to about 100 microns. The process can usually be operated in such a manner as to produce HEVA particles that are substantially spherical if desired. However, such sphericity is not always necessary or advantageous for some purposes, and the invention is in no way restricted to spherical particles. As should be expected, the efficiency of the present dispersion-saponification process and the particle size of the dispersed products will vary to a certain extent with the selected soap, saponification agent and inorganic salt, the temperature, the amounts of reagents employed and other factors with which those skilled in the art are familiar.

The following examples are given to delineate and illustrate the invention. Example 1 distinguishes the invention over DDR No. 88,404 by showing that the nature of the product obtained depends on the mode of recovery. Example 2 demonstrates that a condensed aryl sulfonate in a relatively large amount does not produce a dispersed product. The remaining examples illustrate the invention.

EXAMPLE 1

In a few of the examples of DDR No. 88,404, a dispersing agent was present during the simultaneous dispersion-saponification of a typical high melt index EVA (MI=100). N-oleoylsarcosinate was the dispersing agent most often employed. Hot discharge was used in all cases to recover the powder product. Experiments 1-4 in Table I of this example were taken directly from Table 2 of DDR No. 88,404 and the actual values were converted to show the results on the basis of 150 g of resin charged to the reactor, for ease of comparison with the experiments performed in the present example. Experiment 1 shows that the process of DDR No. 88,404 is operable without any dispersing agent at all; Experiments 2-4 shows the effect of increasing amounts of N-oleoylsarcosinate, which resulted in a shift downward in particle size, yet the particle size was mostly greater than 0.125 mm.

In the present example, two experiments were carried out under conditions of DDR No. 88,404, except that the product was recovered according to the process of this invention by cooling to below about 100° C. before opening the reactor. N-oleoylsarcosinate was employed as dispersing agent and an EVA of similar composition and having a melt index of 124 was employed.

The experiments were performed in a Parr Instrument Company Monel metal pressure reactor of 1-liter capacity, equipped with a stirrer comprising two carved-tooth turbine type discs. The stirrer was rotated by a drill press driven by a 1-horsepower d.c. motor. The reactor was also fitted with a removable electric heater and a thermocouple. Deionized water, EVA copolymer (as pellets), dispersant, and sodium hydroxide pellets in the amounts shown in Table I were added to the reactor, which was then closed, heated and stirred as described in DDR No. 88,404; i.e., when the reactor temperature reached 100° C. the stirrer was started (1200 rpm, measured with a stroboscope), heating was continued so that a temperature of 220° C. was reached after 90 minutes, and thereafter the temperature was held at 220° C. for 0.5 hour. The heating was immediately turned off and the reactor was cooled to below about 100° C. with externally-applied dry ice. The reactor was opened and the contents inspected. Quite surprisingly, no dispersion was produced at two different levels of N-oleoylsarcosinate (Experiments 5 and 6, Table I) that yielded dispersions in DDR No. 88,404 when hot discharge was employed (Experiments 2 and 4).

The only conclusion that can be drawn is that the dispersions observed in DDR No. 88,404 must have formed during the hot discharge operation, i.e., when the hot reaction mixture was expanded through the needle valve into the quench bath. The N-oleoylsarcosinate present apparently reduced particle size somewhat in this process.

To verify this conclusion, a third experiment was then carried out in the reactor of Example 2 of this invention, which was equipped with a bottom draw-off valve that would permit hot discharge into an aqueous quench bath, as in DDR No. 88,404. As expected, a dispersion was now obtained (Experiment 7). However, the particles were irregular and exceedingly fine, much finer than those reported in DDR No. 88,404. This evidence further confirms the conclusion that it is the actual conditions of discharge and expansion through the exit valve of the hot reaction mixture containing the soft molten polymer that are mainly responsible for the formation of a dispersion in the process of DDR No. 88,404.

vertical baffles, 9" long by ¼" wide by ⅛" thick, positioned at 90° intervals about 1/16" off the reactor wall. A ½" drain line and valve are installed in the bottom of the reactor to permit discharge of the reaction mass at operating pressure and temperature. The reaction mass is heated with gentle agitation until the temperature climbs to 440° F. and the agitator speed is then increased to 2000 rpm and continued for 10 minutes while maintaining the temperature at 440° F. There is no dispersion of the resin which remains in the reactor, adheres to the sidewalls and the agitator as a continuous mass, and has to be scraped and melted from the reactor.

EXAMPLE 3

Three different EVA copolymers, containing 8.8, 20.5, and 42.7 weight percent vinyl acetate, were subjected to simultaneous dispersion and saponification in accordance with the process of this invention, employing sodium stearate as the dispersing agent. The process was carried out in the 1-liter Parr Instrument Company Monel metal reactor described in Example 1. The reactor was charged with deionized water, EVA copolymer (as pellets), sodium stearate, sodium hydroxide pellets, and, when used, sodium chloride. The reactor was closed and rapidly heated to temperature. Stirring was applied at 3700 rpm for seven minutes and continued at about 1200 rpm during the selected retention times. At the end of the retention time, the stirring rate of 3700 rpm was resumed, the heating was turned off and the reactor was cooled with externally applied dry ice. When the contents had been cooled to about 120° C., the stirring was reduced to a minimal rate, and upon further cooling to below 100° C., the reactor was opened and the product was recovered.

The HEVA particles were collected by filtration and washed twice with hot (80–90° C.) deionized water to remove soap. There was a subsequent dilute acetic acid wash to insure that any remaining sodium stearate

TABLE I

| Exp. No. | H₂O, ml | Charge to Autoclave EVA Resin | | | NOS, g [1] | NaOH, g | Dispersion-Saponification Conditions | | Recovery Method | Nature of Product |
|---|---|---|---|---|---|---|---|---|---|---|
| | | Amt., g | % VA | Melt Index | | | Temp., °C. | Stirrer Speed, rpm | | |
| 1-1 | 360 | 150 | 23.6 | 100 | none | 18.2 | 220 | 1200 | Hot let-down | powder; 100%>0.125mm |
| 1-2 | 360 | 150 | 23.6 | 100 | 1.8 | 18.2 | 220 | 1200 | Hot let-down | powder;99.1%>0.125mm |
| 1-3 | 360 | 150 | 23.6 | 100 | 5.4 | 18.2 | 220 | 1200 | Hot let-down | powder; 90.7%>0.125mm |
| 1-4 | 360 | 150 | 23.6 | 100 | 9.0 | 18.2 | 220 | 1200 | Hot let-down | powder;82.7%>0.125mm |
| 1-5 | 364 | 150 | 29.2 | 124[3] | 1.9 | 18.3 | 220 | 1200 | Cool below 100° C. | not dispersed |
| 1-6 | 364 | 150 | 29.2 | 124[3] | 9.5 | 18.3 | 220 | 1200 | Cool below 100° C. | not dispersed |
| 1-7 | 364 | 150 | 29.2 | 124[3] | 9.5 | 18.3 | 220 | 1200 | Hot let-down | fine dispersion[2] |

[1] N-oleoylsarcosine
[2] The particles were irregular and exceedingly fine (about 1-2 microns)
[3] This value was established by determining the melt flow rate of the polymer by ASTM D-1238-73E condition A and graphically converting it to melt index (condition E) with curves established for polyethylene.

EXAMPLE 2

200 parts of an EVA copolymer having a density of 0.95, a melt index of 3, and an initial vinyl acetate content of 26.65%, 100 parts of Tamol SN (Rohm and Haas Company), a sodium salt of condensed naphthalene sulfonic acid, 50 parts of sodium hydroxide and 890 parts of water are charged to a modified Series 4500 two liter Parr pressure reactor (Parr Instrument Company, Moline, Illinois). Agitation is provided by three 3" diameter, six-blade, flat turbines, located on 2¼" centers with the lower turbine positioned about ½" above the bottom of the vessel. The reactor also contains four would be converted to sodium acetate to avoid interference from sodium stearate during the vinyl acetate analysis. Correction was applied to the residual vinyl acetate analyses for free stearic acid.

Amounts of the materials charged, the reaction conditions and the product analyses are detailed in Table II.

Comparison of Exps. 1 with 2 of Table II clearly demonstrates that the presence of a water-soluble salt (here sodium chloride) will reduce particle size and produce spherical particles. Comparison of Exps. 3 with 4, 5 with 6, and 7 with 8 again demonstrates that the inclusion of sodium chloride will produce smaller particles.

ual vinyl acetate content by saponification. The results obtained are summarized in Table III.

SUMMARY OF RESULTS OF SIMULTANEOUS
DISPERSION/SAPONIFICATION OF ETHYLENE-VINYL ACETATE (EVA) COPOLYMERS

| Example No. | EVA Copolymer VA Content Wt. %[1] | MFR g/10 min.[2] Cond. E. | MFR g/10 min.[2] Cond. B | (Amt. Charged g. | water ml. | Sodium Stearate g. | NaCl g. | NaOH g. | Dispersion Temp. °C. |
|---|---|---|---|---|---|---|---|---|---|
| 4-1 | 8.8 | 9.4 | — | 150 | 450 | 7.5 | — | 3.4 | 235 |
| 4-2 | " | — | — | " | " | " | 8.75 | " | " |
| 4-3 | 20.5 | 10.6 | — | " | " | " | — | 3.8 | 200 |
| 4-4 | " | " | — | " | " | " | 8.75 | " | " |
| 4-5 | " | " | — | " | " | " | — | 15.2 | " |
| 4-6 | " | " | — | " | " | " | 8.75 | " | " |
| 4-7 | 42.7 | — | 1.6 | 100 | 600 | 15.0 | — | 10.2 | 235 |
| 4-8 | " | — | " | " | " | " | 8.75 | " | " |

| Example No. | Retention Time Min.[4] | Dispersed Product Yield % | Particle Shape | Residual VA wt. %[1] | Particle Size Analysis Microns 25% Below | 50% Below | 75% Below | 100% Below |
|---|---|---|---|---|---|---|---|---|
| 4-1 | 67 | 100 | non-spherical | 6.75 | 80.6 | 128.0 | 161.0 | 250.0[5] |
| 4-2 | " | 100 | spherical | 7.13 | 32.0 | 50.8 | 64.0 | 128.0[5] |
| 4-3 | 27 | 100 | non-spherical | 15.05 | 20.2 | 40.3 | 64.0 | 203.0[5] |
| 4-4 | " | 100 | " | 17.51 | 16.0 | 20.2 | 32.0 | 101.6[5] |
| 4-5 | " | 100 | " | 7.26 | 76.0 | 160.0 | 270.0 | 450.0[6] |
| 4-6 | " | 100 | " | 6.37 | 48.0 | 127.0 | 270.0 | 640.0[6] |
| 4-7 | 17 | 100 | " | 21.94 | 50.8 | 64.0 | 100.0 | 200.0[5] |
| 4-8 | " | 100 | " | 21.50 | 32.0 | 40.3 | 50.8 | 200.0[5] |

[1]Saponification
[2]ASTM D1238-73
[3]Temperature at which dispersion/saponification is carried out.
[4]Retention time was counted from time desired temperature had been reached until rapid cooling was applied.
[5]Number percent for all particle sizes.
[6]Weight percent for all particle sizes.

TABLE III

Effect of Sodium Stearate Level on Particle Size

| Exp. No. | Sodium Stearate, g. | Dispersed Product Percent dispersed | Residual VA wt. % | Screen Analysis in Microns, Wt % <53 | 53-106 | 106-149 | 149-250 | 250-420 | >420 |
|---|---|---|---|---|---|---|---|---|---|
| 1 | 5.0 | 100 | 11.7 | — | — | trace | 2.1 | 22.1 | 75.8 |
| 2 | 7.5 | 100 | 11.4 | — | trace | 6.7 | 38.9 | 40.5 | 13.9 |
| 3 | 10.0 | 100 | 11.7 | 19.5 | 54.2 | 23.2 | 3.1 | — | — |

EXAMPLE 4

This example presents a study of the effect of sodium stearate level on HEVA particle size in the process of this invention. The EVA resin employed in the study contained 27.7 weight percent of combined vinyl acetate on analysis and had a melt index of 2.2 g/10 min.

The experiments of this example were carried out in the 1-liter, Parr Instrument Company Monel metal reactor described in Example 1. In each experiment 100 g of the EVA resin, 300 ml of deionized water, 7.7 g of sodium hydroxide, and the amounts of sodium stearate given in Table III were placed in the reactor. The reactor was sealed and heated to 200° C. Stirring was applied at the rate of 1700 rpm at 200° for a total time of 67 minutes. The reactor was immediately cooled with externally applied dry ice until the internal temperature had fallen to below about 100° C. Stirring at 1700 rpm was continued during the cooling period. The reactor was opened, and the dispersion was diluted with deionized water. Thereafter the particles were recovered by filtration, washed well with hot water to remove soap, dried, and screened. Specimens were analyzed for resid-

EXAMPLE 5

This example presents a study of the effect of sodium stearate level on HEVA particle size in the process of this invention. The EVA resin employed in the study contained 59.8 weight percent of combined vinyl acetate on analysis and had a melt flow rate of 0.49 g/10 min.

The experiments of this example were carried out in the 1-liter, Parr Instrument Company Monel metal reactor described in Example 1. In each experiment 100 g of the EVA resin, 300 ml of deionized water, 30.7 g of sodium hydroxide, and the amounts of sodium stearate given in Table IV were placed in the reactor. The reactor was sealed and heated to 200° C. Stirring was applied at the rate of 2400 rpm at 200° for a total time of 30 minutes. The reactor was immediately cooled with externally applied dry ice until the internal temperature had fallen to below about 100° C. Stirring at 2400 rpm was continued during the cooling period. The reactor was opened, and the dispersion was diluted with deionized water. Thereafter the particles were recovered by filtration, washed well with hot water to remove soap, dried, and screened. Specimens were analyzed for residual vinyl acetate content by saponification. The results obtained are summarized in Table IV.

TABLE IV

| | | Effect of Sodium Stearate Level on Particle Size | | | | | | | |
|---|---|---|---|---|---|---|---|---|---|
| | | | | Dispersed Product | | | | | |
| | Sodium | | Residual | Screen Analysis in Microns, Wt. % | | | | | |
| Exp. No. | Stearate, g. | Percent dispersed | VA wt. % | <53 | 53–106 | 106–149 | 149–250 | 250–420 | >420 |
| 1 | 15 | 100 | .3 | .8 | 1.7 | 3.3 | 6.7 | 16.7 | 70.8 |
| 2 | 20 | 100 | .3 | 3.1 | 9.3 | 10.4 | 12.1 | 25.0 | 40.0 |
| 3 | 25 | 100 | .9 | 12.0 | 15.5 | 17.5 | 45.0 | 7.5 | 2.5 |

What is claimed is:

1. A process for simultaneously dispersing and saponifying ethylene-vinyl acetate copolymer to provide saponified copolymer of desired degree of saponification in finely-divided form which comprises agitating in molten state an ethylene-vinyl acetate copolymer in an aqueous dispersion system comprising an alkali metal soap together with an alkali metal hydroxide in an amount sufficient to saponify the copolymer to a predetermined degree; and cooling the resulting hot dispersion to obtain the saponified copolymer in solid, finely divided form said dispersion being formed in the absence of discharge of the hot dispersion through a restricted orifice into a zone of reduced pressure, the particles comprising the cooled dispersion having a number average diameter ranging from about 20 microns up to about 500 microns, with the majority of particles being less than 250 microns.

2. A process according to claim 1 wherein the soap comprises sodium stearate.

3. A process according to claim 2 wherein said dispersion system comprises a water-soluble substantially neutral salt.

4. A process according to claim 3 wherein the salt comprises sodium chloride.

5. A process according to claim 1 wherein the base comprises sodium hydroxide.

6. A process according to claim 1 wherein the ethylene-vinyl acetate copolymer has a melt index of up to about 25.

7. A process according to claim 6 wherein the ethylene-vinyl acetate copolymer has a melt index of up to about 10.

* * * * *